United States Patent Office 2,738,270
Patented Mar. 13, 1956

2,738,270

PROCESS FOR UTILIZING THE DRY CONTENT OF SULPHITE WASTE LIQUOR

Björn Anders Nelson, Ornskoldsvik, and Nils Viktor Mannbro, Soderhamn, Sweden

No Drawing. Application December 4, 1951, Serial No. 259,898

Claims priority, application Sweden April 1, 1947

3 Claims. (Cl. 92—13)

This invention relates to a process of utilizing the content of total solids in sulphite waste liquors in connection with alkaline digestion of cellulose material. More particularly the invention relates to the treatment of calcium bisulphite waste liquors in combination with the production of sulphate cellulose.

The present application is a continuation in part of our co-pending application Serial Number 18,078 filed March 30, 1948, now abandoned.

In the manufacture of cellulose or wood pulp by cooking wood or other cellulosic raw material in an alkaline cooking liquor in accordance with the soda or sulphate process, a waste liquor is obtained after completion of the cook. This waste liquor, which is commonly called black liquor, contains combustible organic compounds, which have been dissolved during the digestion, and also sodium compounds. In order to reclaim the sodium compounds of the black liquor and simultaneously utilize the organic matter as a fuel, the black liquor is evaporated and the evaporated liquor is injected into a furnace where the organic substances are burnt, while the inorganic substance remains as a residue or ash. This residue or ash is called soda smelt and contains sodium mainly in the form of $Na_2CO_3$ and in the case of a soda smelt obtained by combusting black liquor from the sulfate process, also in the form of a minor amount of sodium sulfide. The soda smelt is in ordinary sulphate or soda mill practice dissolved in water to form an aqueous solution, so-called soda liquor or green liquor. To this liquor burnt lime is added to causticize the liquor. The following reactions take place in causticization:

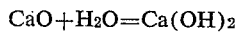
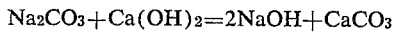

The calcium carbonate or so-called lime-sludge formed by these reactions is allowed to settle and is separated from the causticized liquor, which is used as cooking liquor, usually called white liquor, for a new cook. Before the lime-sludge is discharged from the process it is washed with water to avoid losses of for instance NaOH. The water, which has been used for washing the lime-sludge, is thereupon used to dissolve a fresh quantity of soda smelt. To compensate for unavoidable losses of sodium compounds in the process, a certain quantity thereof must of course be added, either in the form of sodium carbonate in the soda process or in the form of sodium sulphate in the sulphate process.

In accordance with the present invention it is proposed to dissolve the soda smelt in sulphite waste liquor instead of in water. Sulphite waste liquor which is the spent reaction liquor obtained from the digesters in the manufacture of pulp in accordance with the sulphite process, contains usually about 85 to 90% of water, the remaining 10 to 15% consisting substantially of combustible substances.

Either a sodium-base or a calcium-base sulphite waste liquor may be used in the process of this invention. If a calcium-base sulphite waste liquor is employed, the total amount of calcium present in the sulphite liquor will be precipitated, when the soda smelt is dissolved in the liquor, if the sodium carbonate is present in excess, as represented by the formula:

Ca compound $+ Na_2CO_3 = Na_2$ compound $+ CaCO_3$

If a sodium-base sulphite waste liquor is employed, no precipitation will of course occur.

After dissolution of the soda smelt in the sulphite waste liquor, the solution obtained is causticized in the usual manner by adding lime as explained above, and after separation of the lime sludge the causticized liquor is used as cooking liquor in the usual manner. The causticized liquor contains the combustible matter of the sulphite waste liquor in solution. These substances will therefore be passed in the liquor to the digesters and will remain in the black liquor withdrawn from the digesters after cooking. This black liquor will thus contain the combustible matter dissolved during the alkaline digestion as well as the combustible matter added with the sulphite waste liquor. When the black liquor is burnt after evaporation in the usual manner the combustible substances derived from the sulphite waste liquor will thus be burnt together with the combustible matter dissolved during the alkaline digestion.

The principal advantage of the above outlined process in accordance with the present invention is that it eliminates the necessity of evaporating the sulphite waste liquor in order to utilize the combustible solids contained therein as a fuel. Evaporation of sulphite waste liquor is a very difficult procedure, particularly when a calcium bisulphite liquor is to be treated, since the liquor contains substances which tend to form deposits or incrustations in the evaporators. By the process of this invention these difficulties are avoided.

In cases when the fermentable sugars of the sulphite liquor are converted into ethyl alcohol, the waste liquor is neutralized with lime sludge, slaked lime or soda before being utilized in the sulphate process in accordance with this invention. According to a suitable mode of carrying out the process, the sulphite waste liquor, before being added for dissolving the soda smelt, may be used for washing the lime sludge from the causticization operation for recovering alkali remaining in said lime sludge, or for similar purposes.

The cooking liquor prepared according to the invention may be used for digestion of sulphate cellulose according to the known methods.

In the following, we will describe a laboratory experiment for the preparation of liquor and cooking sulphate pulp according to the present invention. For experimental reasons and in order to obtain the desired concentration of NaOH in the liquor, which in this experiment could not be exactly calculated in advance, a "stronger" causticized liquor was mixed with a "weaker" uncausticized liquor. In practice, it will be possible to control the amounts of soda smelt and sulfite waste liquor as well as the causticizing process on the basis of preliminary trials, so that only one cooking liquor need be prepared and charged to the digesters.

1000 grams of a smelt soda from a modern recovery unit was dissolved in 6000 cc. calcium bisulphite waste liquor. This liquor was causticized with 500 grams of lime at a temperature of 95° C. After sedimentation the liquor was separated from the calcium carbonate sludge. The causticized liquor contained 76.2 grams per litre of NaOH and 26.9 grams per litre of $Na_2S$.

Another part of the sulphite waste liquor was only treated with smelt for precipitation of the calcium in the sulphite waste liqour as calcium carbonate and sulphite. A cooking liquor containing 40.3 grams per litre of NaOH and 10.4 grams per litre of the Na₂S was prepared by mixing the two liquors.

1700 grams of chips (78.7 per cent dry) from Swedish pine and 6000 cc. of the mixed cooking liquor were put into an electrically heated laboratory digester with a capacity of 10 litres. The temperature was increased to 170° C. in 2½ hours and remained there in 3 hours until the pressure was blown down. The yield of screened dry pulp was 45.5 per cent based on dry wood. The Roe chlorine number was 5.5.

Further experimental cookings were carried out with make up black liquor from one cook to another as is practiced in most mills and with varying proportions of reagent to wood. The results have shown that no precipitation at all takes place during such cooking and that the sulphate cellulose obtained is quite equal in quality to cellulose produced in the usual manner, i. e by the aid of common sulphate liquor.

The recovery of alkali from the waste liquor obtained when applying the process according to the invention may be effected in accordance with the usual methods.

Due to the addition of sulphite waste liquor in the regeneration of the black liquor, the green liquors will obtain so high a sulphidity that sulphur must be removed therefrom, which may be effected in any suitable manner. Said surplus sulphur, if desired, may be used in the sulphite cellulose production. For this purpose, according to a suitable manner of carrying out the process, flue gases are introduced into the crude green liquor, whereby hydrogen sulphide is expelled, which is burnt to sulphur dioxide and which then suitably may be used for the production of new sulphite cooking liquor. The burning of pyrites or sulphur in the production of sulphite cooking liquor may be limited or wholly eliminated. In this manner losses occurring in the recovery of sulphur may be suitably compensated by addition of sulphur, sodium sulphate or other sulphur compounds in the sulphate process.

The contents of solid matter in the black liquor is increased with the quantity of solid matter which is contained in the waste sulphite liquor. Consequently, the organic solid matter of the latter may be used in the same manner as that of the black liquor, i. e. especially for burning after previous evaporation. This involves considerable advantages both from apparatus point of view and with regard to the thermal economy of the process.

It may be mentioned that the process according to the invention, although described above mainly in connection with sulphate cellulose production, may also advantageously be applied in connection with other alkaline digesting methods. Further, when digesting according to this process, there is also formed vanillin as a byproduct, which may be extracted from the black liquor.

Having now particularly described the nature of our invention and the manner of its operation what we claim is:

1. The method which comprises dissolving, in sulphite waste liquor, soda smelt obtained from the recovery furnace in regeneration of black liquor from alkaline digestion of cellulosic material, causticizing the resulting solution with lime to produce a liquor suitable for alkaline digestion of cellulosic material, digesting cellulosic material with said liquor to produce pulp and black liquor, and combusting said black liquor to form soda smelt.

2. Method according to claim 1, in which lime sludge obtained in the causticizing operation is washed with sulphite waste liquor and said liquor is then used to dissolve said soda smelt.

3. Method according to claim 1, which comprises treating said solution of soda smelt with flue gases, burning expelled hydrogen sulphide to form sulphur dioxide and adding said sulphur dioxide to sulphite cooking liquor.

References Cited in the file of this patent
UNITED STATES PATENTS

| | | |
|---|---|---|
| 1,691,511 | Bates | Nov. 13, 1928 |
| 1,702,586 | Bradley et al. | Feb. 19, 1929 |
| 1,747,047 | Bradley | Feb. 11, 1930 |
| 1,961,351 | Gustin | June 5, 1934 |
| 2,072,177 | Moore | Mar. 2, 1937 |
| 2,248,978 | Francisco | July 15, 1941 |
| 2,552,183 | Knight | May 8, 1951 |
| 2,696,424 | Schoeffel | Dec. 4, 1954 |